(12) United States Patent (10) Patent No.: US 12,166,418 B2
Sun et al. (45) Date of Patent: Dec. 10, 2024

(54) POWER CONVERTER AND CONTROL CIRCUIT THEREOF

(71) Applicant: SHANGHAI BRIGHT POWER SEMICONDUCTOR CO., LTD., Shanghai (CN)

(72) Inventors: Shungen Sun, Shanghai (CN); Hanfei Yang, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 200 days.

(21) Appl. No.: 17/556,666

(22) Filed: Dec. 20, 2021

(65) Prior Publication Data

US 2023/0198395 A1 Jun. 22, 2023
US 2023/0387798 A9 Nov. 30, 2023

(30) Foreign Application Priority Data

Dec. 31, 2020 (CN) .......................... 202011622327.4

(51) Int. Cl.
*H02M 3/158* (2006.01)
*H02M 1/00* (2006.01)
*H02M 1/08* (2006.01)

(52) U.S. Cl.
CPC ......... *H02M 3/158* (2013.01); *H02M 1/0009* (2021.05); *H02M 1/0025* (2021.05); *H02M 1/0032* (2021.05); *H02M 1/083* (2013.01)

(58) Field of Classification Search
CPC . H02M 1/0025; H02M 1/0032; H02M 1/0009
See application file for complete search history.

(56) References Cited

U.S. PATENT DOCUMENTS 10,404,168 B2 * 9/2019 Trichy .................. H02M 3/157
2013/0135775 A1 * 5/2013 Yao .......................... H02M 1/08
361/18

(Continued)

FOREIGN PATENT DOCUMENTS

CN 203722465 U 7/2014
CN 104539154 A 4/2015

*Primary Examiner* — Alex Torres-Rivera
(74) *Attorney, Agent, or Firm* — MUNCY, GEISSLER, OLDS & LOWE, P.C.

(57) ABSTRACT

A control circuit for a switched-mode power converter to generate a control signal for controlling switching transistors in the power converter is disclosed. The control circuit includes: a comparator; a ramp compensation circuit for producing and applying a ramp compensation signal to a first or second input of the comparator; an on-time generation circuit to generate an on-time timer signal; and a control signal generation circuit to generate, based on the comparison signal and the on-time timer signal, the control signal for controlling the switching transistors in the power converter. The ramp compensation signal output from the ramp compensation circuit is configured with: a first slope during an inductor demagnetization interval in operation of the power converter in CCM and a second slope during an inductor demagnetization interval and a zero-current interval in operation of the power converter in DCM, the first slope is greater than the second slope.

14 Claims, 10 Drawing Sheets

(56) References Cited

U.S. PATENT DOCUMENTS

| | | | | |
|---|---|---|---|---|
| 2014/0320104 | A1* | 10/2014 | Guo | H02M 3/1588 |
| | | | | 323/290 |
| 2015/0311798 | A1* | 10/2015 | Yuan | H02M 3/156 |
| | | | | 323/288 |
| 2019/0356223 | A1* | 11/2019 | Chang | H02M 3/156 |
| 2021/0384830 | A1* | 12/2021 | Bertolini | H02M 1/0025 |

* cited by examiner

POWER CONVERTER AND CONTROL CIRCUIT THEREOF

CROSS-REFERENCE TO RELATED APPLICATION

This application claims the priority of Chinese patent application number 202011622327.4, filed on Dec. 31, 2020, the entire contents of which are incorporated herein by reference.

TECHNICAL FIELD

This application relates generally to the field of power electronics, and particularly to a power converter and a control circuit thereof.

BACKGROUND

Constant on-time (COT) control has found extensive use in power converters thanks to its excellent dynamic response and relatively high efficiency under light loading.

Despite the fast dynamic response and desirable efficiency under light loading, COT control is imposing stringent requirements on the output voltage's ripple shape. However, voltage ripple is known to be detrimental to the load when present at a significant level. Traditionally, this was mitigated usually by a ramp compensation signal superimposed on a feedback signal or voltage reference. Such a ramp compensation signal was often generated by charging and discharging of a current source or by RC oscillation.

Further, in order to have higher applicability, a power converter is required to operate stably in both a continuous inductor current mode (CCM) and a discontinuous inductor current mode (DCM). However, during DCM operation of the power converter, a ramp compensation signal introduced tends to bring about false triggering, which is detrimental to the stability.

SUMMARY OF THE INVENTION

The problem to be solved hereby is to provide a power converter, as well as a control circuit and method thereof, which enable stable operation of the power converter in CCM and DCM.

The above problem is solved by a control circuit for a switched-mode power converter provided herein, which is configured to generate a control signal for controlling switching transistors in the power converter, and wherein the control circuit comprises: a comparator provided with a first input, a second input and an output, wherein: the first input of the comparator is configured to receive at least a reference signal; the second input of the comparator is configured to receive at least a feedback signal; and the output of the comparator is configured to output a comparison signal, and wherein the feedback signal is derived from an output voltage; a ramp compensation circuit configured to generate and apply a ramp compensation signal to the first or second input of the comparator; an on-time generation circuit configured to start a timer based on the comparison signal or the control signal to generate an on-time timer signal; and a control signal generation circuit configured to generate, based on the comparison signal and the on-time timer signal, the control signal for controlling the switching transistors in the power converter, wherein the ramp compensation signal output from the ramp compensation circuit is configured with: a first slope during an inductor demagnetization interval in operation of the power converter in a continuous inductor current mode (CCM); and a second slope during an inductor demagnetization interval and a zero-current interval in operation of the power converter in a discontinuous inductor current mode (DCM), and wherein the first slope is greater than the second slope.

In one embodiment of this application, the ramp compensation circuit may further comprise an operating mode detection circuit, wherein the operating mode detection circuit is configured to detect an operating mode of the power converter in the current period and to output a mode detection result signal to the ramp compensation circuit.

In one embodiment of this application, the mode detection circuit may comprise a zero crossing detector to detect whether a zero crossing of the power converter's inductor current occurs in the current period, wherein: the mode detection result signal indicating that the power converter is operating in the DCM is output if a zero crossing of the power converter's inductor current in the current period is detected by the zero crossing detector; or the mode detection result signal indicating that the power converter is operating in the CCM operation is output if no zero crossing of the power converter's inductor current is detected by the zero crossing detector in the current period.

In one embodiment of this application, the zero crossing detector may comprise: a first comparator comprising a first terminal, a second terminal and an output, wherein: the first terminal of the first comparator receives a sense signal indicating the inductor current of the power converter; the second terminal of the first comparator receives a zero crossing detection (ZCD) threshold; and the output of the first comparator outputs a zero crossing indicator signal; a first delay module, which receives the zero crossing indicator signal and generates a delayed zero crossing indicator signal by delaying the zero crossing indicator signal; a first AND gate comprising two inputs and an output, wherein: the two inputs of the first AND gate respectively receive the zero crossing indicator signal and the delayed zero crossing indicator signal; and the output of the first AND gate outputs a zero crossing detection result; and a sample-and-hold module, which samples the zero crossing detection result at the end of each operating period and holds the sampled values at other times, and outputs the mode detection result signal.

In one embodiment of this application, in the event of detecting a change in current mode, the ramp compensation circuit may switch the ramp compensation signal from the first slope to the second slope or vice versa in the next operating period.

In one embodiment of this application, the ramp compensation circuit may comprise: a compensation capacitor comprising a compensation signal terminal and a ground terminal, the ground terminal of the compensation capacitor connected to a reference ground; a first charging branch configured to charge the compensation capacitor at a first current in a controlled manner; a first discharging branch configured to discharge the compensation capacitor at a second current in a controlled manner; and a second discharging branch configured to discharge the compensation capacitor at a third current in a controlled manner, wherein the second discharging branch works in CCM operation but not in DCM operation of the power converter.

In one embodiment of this application, the control circuit may further comprise an enable circuit, wherein the enable circuit comprises an AND gate provided with two inputs and an output, wherein the two inputs of the AND gate is configured to respectively receive a mode detection result signal and an OFF indicator signal indicating an inductor demagnetization interval or a zero-current interval, wherein the output of the AND gate is configured to output an enable signal, wherein the enable circuit is configured to disable the second discharging branch when the mode detection result signal indicates that the power converter is during an inductor demagnetization interval or a zero-current interval under DCM operation.

In another embodiment of this application, the ramp compensation circuit may comprise: a compensation capacitor comprising a compensation signal terminal and a ground terminal, the ground terminal of the compensation capacitor connected to a reference ground; a first charging branch configured to charge the compensation capacitor at a first current in a controlled manner; and a first configurable discharging branch configured to discharge the compensation capacitor at a second discharging current in CCM operation of the power converter and to discharge the compensation capacitor at a third discharging current in DCM operation of the power converter, the second discharging current greater than the third discharging current.

In a further embodiment of this application, the control circuit may further comprise a discharging current adjustment circuit comprising an AND gate and a single pole double throw (SPDT) switch, the AND gate comprising two inputs and an output, wherein: the two inputs of the AND gate are configured to respectively receive a mode detection result signal and the control signal; a and an output of the AND gate is configured to control the SPDT switch to switch between a first current reference and a second current reference, wherein the first and second current references are configured to set the second and third discharging currents respectively, and wherein the discharging current adjustment circuit is configured to select the second current reference when the mode detection result signal indicates that the power converter is during an inductor demagnetization interval or a zero-current interval under DCM operation.

The above problem is also solved by a switched-mode power converter provided therein, which comprises a switching transistor and a control circuit to generate a control signal for controlling the switching transistors. The control circuit comprises a comparator provided with a first input, a second input and an output, wherein: the first input of the comparator is configured to receive at least a reference signal; the second input of the comparator is configured to receive at least a feedback signal and the output of the comparator is configured to output a comparison signal, the feedback signal derived from an output voltage; a ramp compensation circuit configured to generate and apply a ramp compensation signal to the first or second input of the comparator; an on-time generation circuit configured to start a timer based on the comparison signal or the control signal to generate an on-time timer signal; a control signal generation circuit configured to generate, based on the comparison signal and the on-time timer signal, the control signal for controlling the switching transistors in the power converter, wherein the ramp compensation signal output from the ramp compensation circuit is configured with: a first slope during an inductor demagnetization interval in operation of the power converter in a continuous inductor current mode (CCM) and a second slope during an inductor demagnetization interval and a zero-current interval in operation of the power converter in a discontinuous inductor current mode (DCM), and the first slope is greater than the second slope.

The advantage of this application over the prior art is that the proposed power converter is capable of stable operation in CCM and DCM through adjusting the discharging slope of the ramp compensation circuit separately in the two modes.

BRIEF DESCRIPTION OF THE DRAWINGS

The accompanying drawings, which are incorporated in and constitute a part hereof, illustrate embodiments of this application to facilitate the understanding thereof, together with the specification, serve to explain the disclosed principles. In these figures.

DETAILED DESCRIPTION

Objects, features and advantages of the present application will become more apparent from the following detailed description of specific embodiments hereof, which is to be read in connection with the accompanying drawings.

In the following description, numerous details are set forth so that a full understanding of this application may be acquired. However, the application may be practiced in other forms than those described herein. Therefore, the application is in no way limited to the particular embodiments described hereinafter.

As used herein, the singular forms "a", "an" and/or "the" are intended to include the plural forms as well, unless the context clearly indicates otherwise. In general, the terms "comprising" and "including" only imply the presence of expressly stated steps and elements, which do not constitute an exclusive list though, as other steps or elements may also be included.

In addition, it is to be noted that although the terms "first", "second", etc. may be used to describe various elements, these terms are only used to distinguish one element from another and have no special meaning unless otherwise stated. Therefore, they should not be construed as limiting the scope of this application in any sense. Additionally, although the terms used herein are selected from common general terms, some terms mentioned in the description of embodiments hereof may be selected by the applicant at his or her discretion, and the detailed meanings thereof are explained in the relevant part of the description herein. Further, the present application should be understood not only by the terms actually used, but also by the meaning contained in each term.

It will be understood that when an element is referred to as being "on", "connected to", "coupled to" or "in contact with" another element, it can be directly on, connected or coupled to, or in contact with the other element or intervening elements may also be present. In contrast, when an element is referred to as being "directly on", "directly connected to", "directly coupled to" or "in direct contact with" another element, there are no intervening elements present. Similarly, when a first element is referred to as being "electrically connected to" or "electrically coupled to" a second element, it is meant that there is an electrical path allowing the passage of a current therethrough between the first and second elements. Such an electrical path may include a capacitor, coupled inductor and/or other element that allows a current to pass therethrough even when there is no direct contact between conductive elements.

In embodiments of this application, there is provided a power converter, as well as a control circuit and method thereof.

Figure 1A:
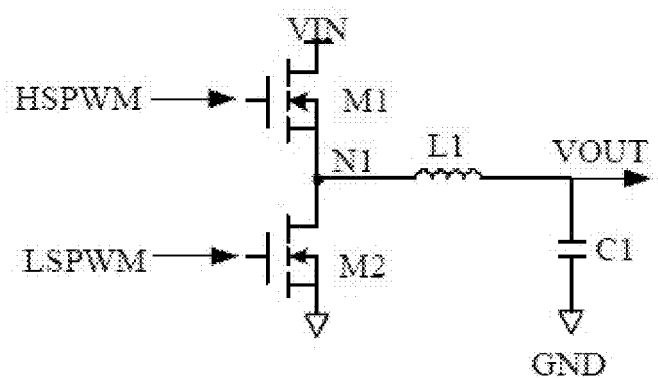
FIGS. 1A and 1B schematic circuit diagrams of a power converter according to an embodiment of this application.
Figure 1B:
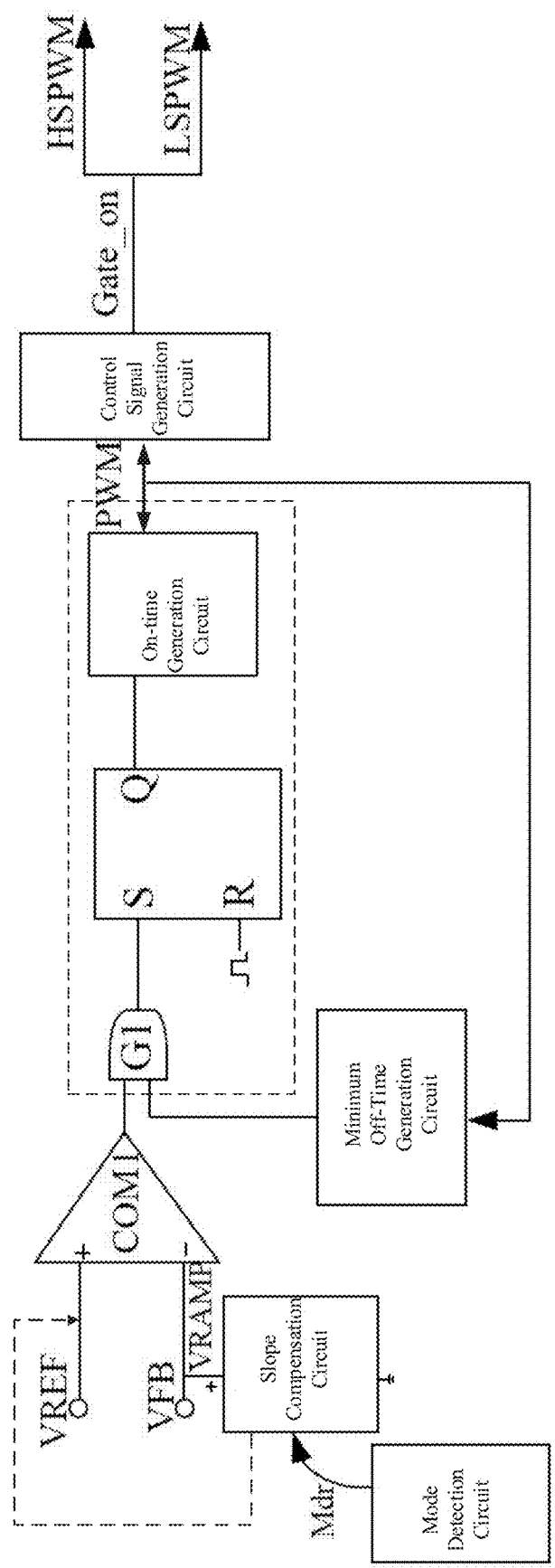

FIGS. 1A and 1B are schematic circuit diagrams of a power converter according to an embodiment of this application, in which a switching circuit including switching transistors is shown by FIG. 1A and a control circuit in the power converter is shown by FIG. 1B. As shown in FIG. 1A, the switching transistors in the switching circuit may in particular include a first switching transistor M1 and a second switching transistor M2, which are connected in series. Specifically, each of the first switching transistor M1 and the second switching transistor M2 has a source, a gate and a drain, and the source of the first switching transistor M1 is connected to the drain of the second switching transistor M2 at a node N1. In one embodiment, an output inductor L1 and an output capacitor C1 are connected to the node N1 where the first switching transistor M1 is connected in series to the second switching transistor M2. A first terminal of the output inductor L1 is coupled to the node N1, and a second terminal of L1 is connected to a first terminal of the output capacitor C1. A second terminal of the output capacitor C1 is grounded.

With continued reference to FIG. 1A, an input voltage VIN is received at the drain of the first switching transistor M1 in the switching circuit, and the source of the second switching transistor is grounded. An output voltage VOUT is present at the first terminal of the output capacitor C1. The gates of the first switching transistor M1 and the second switching transistor M2 are configured to receive a first control signal HSPWM and a second control signal LSPWM, respectively. The first and second switching transistors M1, M2 may be selected as required, for example, as NMOS switching transistors.

As shown in FIG. 1B, in one embodiment, the control circuit in the power converter includes a comparator COM1, a ramp compensation circuit, an on-time generation circuit and a control signal generation circuit. The control circuit in the power converter may further include a minimum off-time generation circuit and a logic circuit.

Referring to FIG. 1B, the comparator COM1 has a first input, a second input and an output. The first input receives a reference signal VREF, and the second input receives a feedback signal VFB.

The ramp compensation circuit is configured to generate a ramp compensation signal VRAMP and apply it to the first or second input of the comparator. The on-time generation circuit is configured to start a timer based on the comparison signal or the control signal and to generate an on-time timer signal.

In some embodiments, the ramp compensation circuit includes a compensation capacitor. The ramp compensation circuit may further include a current source and a switch.

The control signal generation circuit is configured to generate, based on the comparison signal and the on-time timer signal, a control signal Gate_on for controlling the switching transistors in the power converter. Based on the control signal Gate_on, the first and second control signals HSPWM, LSPWM for controlling the first and second switching transistors M1, M2, respectively, are generated.

The minimum off-time generation circuit is configured to overcome the influence of the parasitic capacitance of components in the control circuit itself, e.g., the switching transistors, avoiding the power converter from being switched on again before the output voltage of its circuit that is being switched off drops to zero and thus from causing additional circuit loss and conduction and radiation interference or damage to circuit elements.

The logic circuit includes a first input, a second input and an output. The first input of the logic circuit is coupled to the output of the comparator COM1 to receive the comparison signal. The second input of the logic circuit is coupled to an output of the minimum off-time generation circuit to receive a minimum off-time signal. The output of the logic circuit is coupled to an input of the on-time generation circuit. An on-time signal PWM is formed at an output of the on-time generation circuit. The first control signal HSPWM and the second control signal LSPWM are generated from the on-time signal PWM by a drive circuit are configured to switch on/off the first switching transistor M1 and the second switching transistor M2, respectively. The feedback signal VFB is derived from the output voltage VOUT, e.g., by voltage-division resistor network.

In one embodiment, the logic circuit includes an AND gate G1 and an RS flip-flop. First and second inputs of the AND gate G1 are coupled to the outputs of the comparator and the minimum off-time generation circuit in order to receive the comparison signal and the minimum off-time signal, respectively. An output of the AND gate G1 is connected to an S terminal of the RS flip-flop, and a Q terminal of the RS flip-flop is coupled to the input of the on-time generation circuit in order to provide an excitation signal. A reset signal is received at an R terminal of the RS flip-flop. The reset signal may be either a synchronous signal or an asynchronous signal.

During operation of the circuit, when a voltage at the first input of the comparator is higher than a voltage at the second input, the output of the comparator, i.e., the comparison signal, is pulled high. If the output of the minimum off-time generation circuit is also high, the output of the AND gate G1 is set high. In response to the excitation signal being received at the S terminal of the RS flip-flop, an output signal is produced at the Q terminal, which is coupled to the input of the on-time generation circuit, enabling the on-time generation circuit. The on-time signal PWM is then generated at the output of the on-time generation circuit and then passed through the drive circuit, resulting in generating the first control signal HSPWM for switching on/off the first switching transistor M1 and generating the second control signal LSPWM for switching on/off the second switching transistor M2 and thus enabling power conversion.

In one embodiment, the on-time signal is inversely proportional to the input voltage VIN and proportional to the output voltage VOUT in amplitude. This allows the switching circuit to maintain a substantially constant switching frequency under various conditions of the input voltage VIN and output voltage VOUT.

Voltages that may be present at the second input of the comparator include the feedback voltage VFB and the ramp compensation voltage (i.e., the ramp compensation signal) VRAMP. In absence of the ramp compensation signal VRAMP, in spite of providing fast dynamic response and satisfactory efficiency under light loading, constant on-time (COT) control may impose strict requirements on the output voltage's ripple shape.

When the output capacitor has a very small equivalent series resistance (ESR), as ripple on the output capacitor C1 lags behind a current $I_L$ in the output inductor L1 in phase by 90 degrees, the output voltage does not reflect variation in inductor current $I_L$ in a timely manner. When the first control signal HSPWM (and thus the on-time signal PWM) is high, the inductor current $I_L$ increases, but due to the 90-degree phase offset, the output voltage VOUT cannot be established in time, failing to cause the feedback voltage VFB to ramp. Consequently, it may occur that VFB remains lower than VREF after a current switch-on period of the HSPWM signal has elapsed, creating an unwanted additional PWM pulse, which may lead to unequal intervals of the signal PWM and unstable operation. Therefore, increased circuit stability can be obtained by adding the ramp compensation signal VRAMP to the feedback signal VFB or by subtracting the ramp compensation signal VRAMP from VREF.

Figure 2:
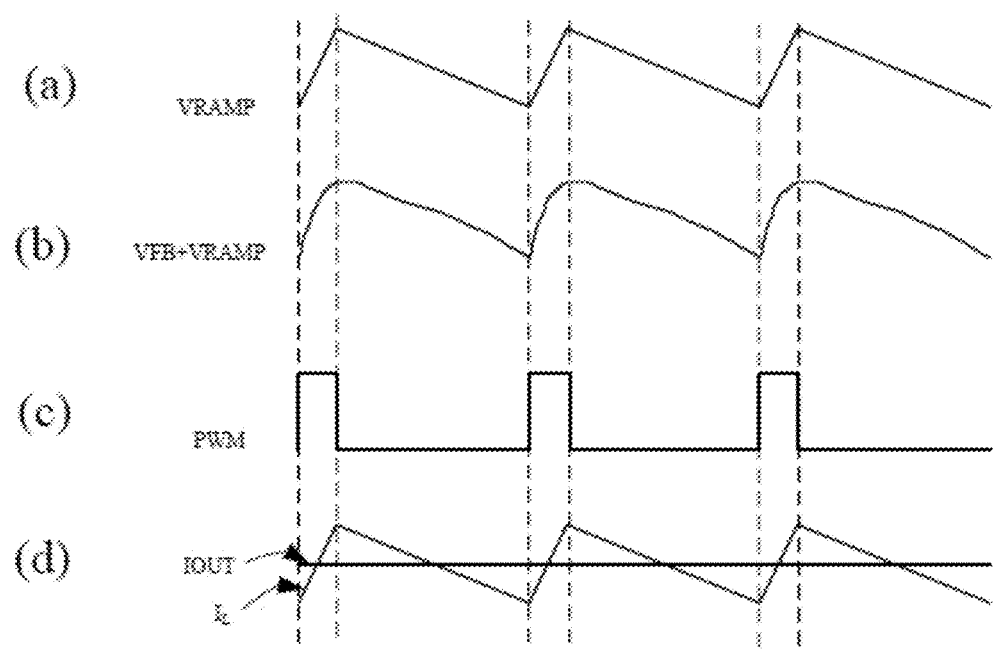
FIG. 2 shows waveforms in the power converter operating in a continuous inductor current mode (CCM) according to an embodiment of this application.

The ramp compensation signal (or ramp compensation signal) VRAMP is a periodic signal with the same period as the signal PWM, and amplitude of the VRAMP signal may vary within a fixed range. For example, the ramp compensation signal VRAMP may be in the form of a periodic serrated wave, as shown in FIG. 2. Chart (a) of FIG. 2 schematically illustrates ramp compensation waveforms in the power converter in a steady state in a continuous inductor current mode (CCM) according to an embodiment of this application. Chart (b) of FIG. 2 shows a waveform of the feedback signal VFB superimposed with the ramp compensation signal VRAMP. Chart (c) of FIG. 2 shows a waveform of the on-time signal PWM. Waveforms of the inductor current $I_L$ and an output current $I_{OUT}$ can be seen in chart (d) of FIG. 2. $I_{OUT}$ is a load current, and its waveform is dependent on the characteristics of the load. For example, if the load is operating at an intermittent constant current, the load current $I_{OUT}$ may transition between different values. Alternatively, if the load is operating in a constant current mode, the load current may maintain a substantially constant value.

The above ramp compensation approach can ensure good stability in steady-state CCM operation of the power converter. However, in a discontinuous inductor current mode (DCM), co-existence of two or even more PWM pulses may occur in the circuit in the above described ramp compensation approach, leading to the problems of increased output ripple, degraded load output regulation, or even electromagnetic interference (EMI) and audio noise.

Figure 3A:
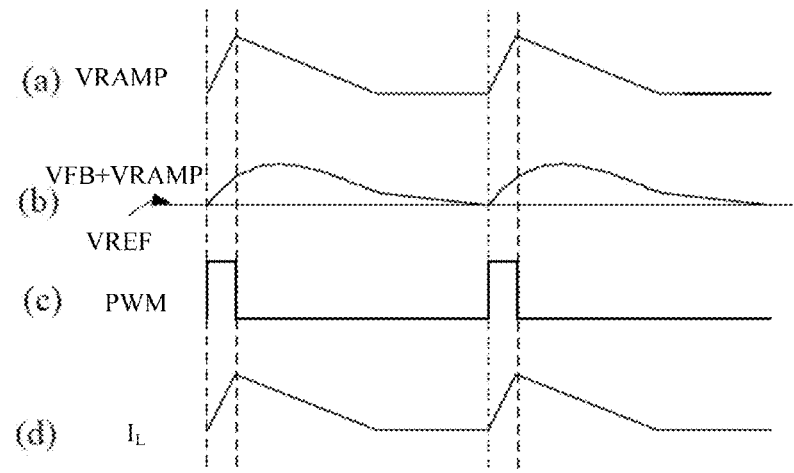
FIG. 3A shows waveforms in the power converter operating ideally in a discontinuous inductor current mode (DCM).

Specifically, in DCM operation, the second switching transistor M2 in the switching circuit is turned off following a zero crossing of the inductor current $I_L$. At this point, the ramp compensation signal VRAMP just falls back to zero volts, and then remains at zero volts until the next PWM cycle begins. That is, no ramp compensation is provided during this period. As a result, the voltage of VFB may be very close to the voltage of VREF. Ideally, this compensation mechanism does not cause the problem of instability. FIG. 3A shows ideal waveforms in the power converter in DCM operation.

Figure 3B:
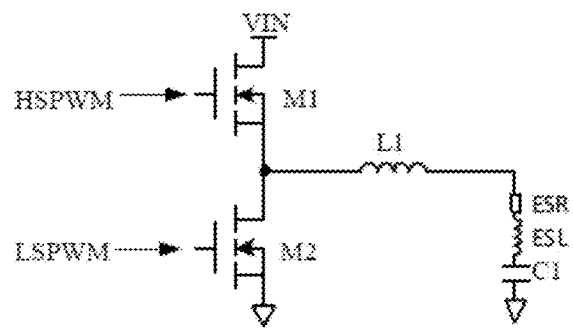
FIG. 3B is a schematic illustration of an output capacitor with equivalent series resistance (ESR) and equivalent series inductance (ESL) in an output circuit of the power converter.
Figure 3C:
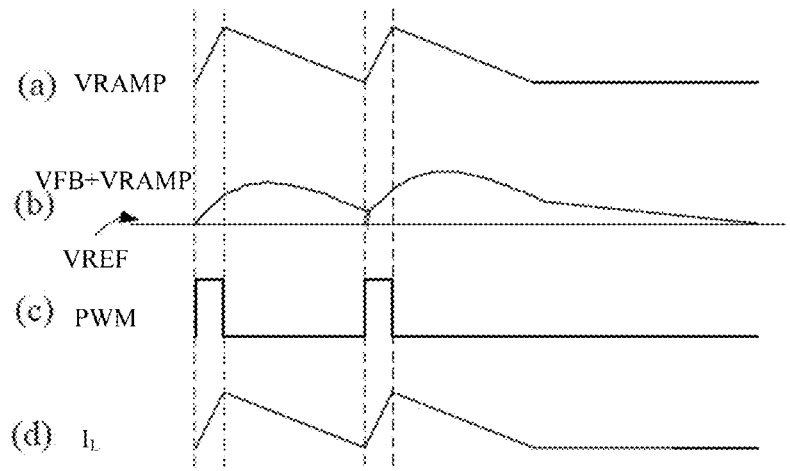
FIG. 3C shows waveforms in the case of false triggering occurring in DCM operation of the power converter.

However, in actual circuit implementations, shown in FIG. 3B, due to equivalent series resistance (ESR) and equivalent series inductance (ESL) of the output capacitor C1, following a zero crossing or zero crossing detection (ZCD) of the inductor current $I_L$, the output voltage VOUT may experience an undesirable drop or some glitches or oscillations. Additionally, a voltage $V_{DS}$ at the drain of the second switching transistor M2 may also experience oscillations following the ZCD, which may be coupled to VFB by parasitic capacitance of the switching transistor, decreasing VFB+VRAMP below VREF and thus falsely triggering a new PWM pulse. FIG. 3C shows waveforms in the case of false triggering occurring in DCM operation of the power converter. Chart (b) of FIG. 3C shows a waveform of the feedback signal VFB superimposed with the ramp compensation signal VRAMP. Chart (c) of FIG. 3C shows a waveform of the on-time signal PWM. A waveform of the inductor current $I_L$ can be seen in chart (d) of FIG. 3C.

In one embodiment of this application, in order to overcome the false triggering problem and enable stable DCM operation of the power converter, the ramp compensation signal output from the ramp compensation circuit is configured with a first slope during an inductor demagnetization interval of the inductor in CCM operation of the power converter and with a second slope during an inductor demagnetization or zero-current interval in DCM operation of the power converter, and the first slope is greater than the second slope.

Figure 4:
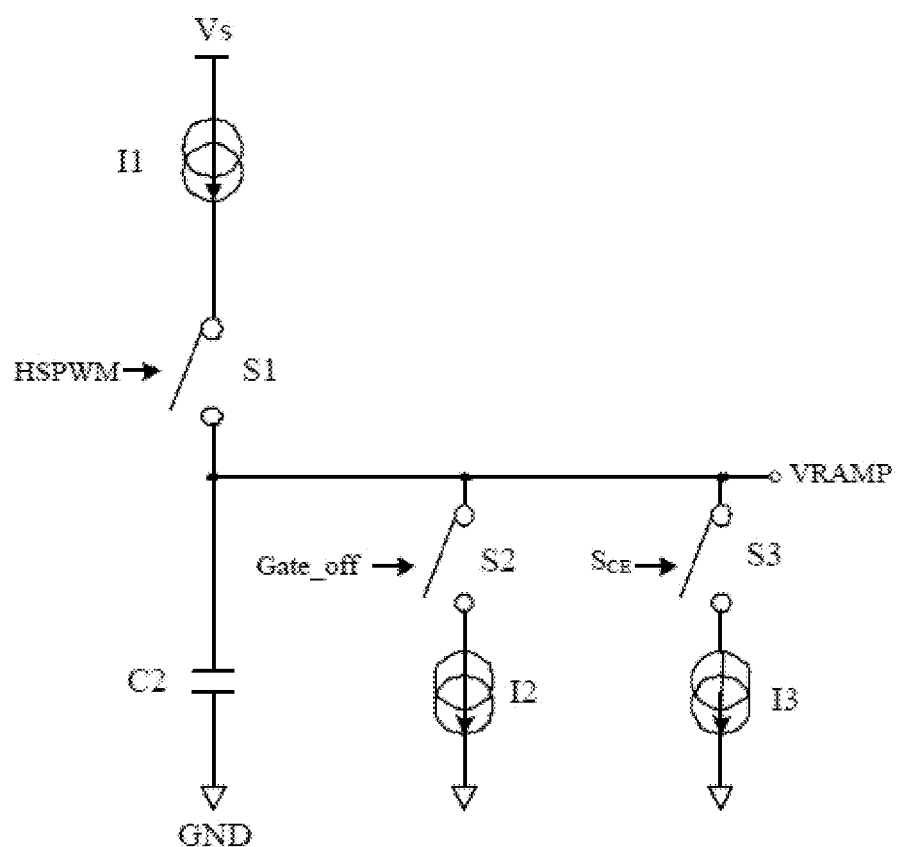
FIG. 4 is a structural schematic of a ramp compensation circuit according to an embodiment of this application.

In one embodiment, as shown in FIG. 4, the ramp compensation circuit includes a compensation capacitor C2, a first charging branch, a first discharging branch and a second discharging branch. The compensation capacitor C2 has a compensation signal terminal and a ground terminal. The first charging branch is made up of a first constant current source connected in series to a first switch S1 and is configured to charge the compensation capacitor C2 at a first current I1 in a controlled manner. A control terminal of the first switch S1 is configured to receive the first control signal HSPWM to enable the controlled charging. The first discharging branch is made up of a second constant current source connected in series to a second switch S2 and is configured to discharge the compensation capacitor C2 at a second current I2 in a controlled manner. A control terminal of the second switch S2 is configured to receive an OFF indicator signal Gate_off to enable the controlled discharging, the OFF indicator signal indicating the ongoing of a demagnetization interval or a zero-current interval (in which the first switching transistor M1 is OFF). The second discharging branch is made up of a third constant current source connected in series to a third switch S3 and is configured to discharge the compensation capacitor C2 at a second current I3 in a controlled manner. The second discharging branch works in CCM operation but not in DCM operation of the power converter.

In some embodiments, the control circuit in the power converter further includes an operating mode detection circuit configured to detect an operating mode of the power converter in the current period and output a mode detection result signal to the ramp compensation circuit.

As an example, the mode detection circuit may include a zero crossing detector configured to detect whether a zero crossing occurs to the inductor current of the power converter in the current period. If the zero crossing detector detects that there is a zero crossing of the power converter's inductor current in the current period, then the output mode detection result signal indicates that the power converter is being in DCM operation. If the zero crossing detector detects that there is no zero crossing of the power converter's inductor current in the current period, then the output mode detection result signal indicates that the power converter is being in CCM operation.

Figure 5:
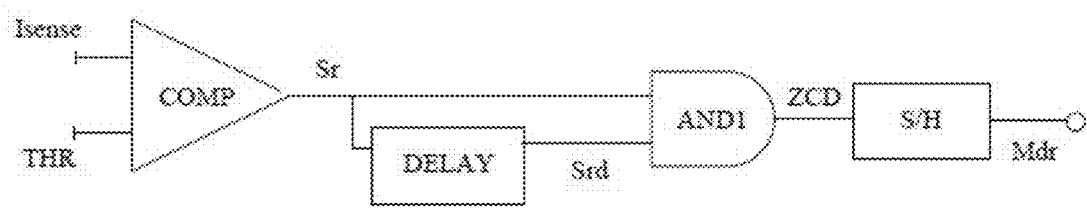
FIG. 5 is a structural schematic of a mode detection circuit in the power converter according to an embodiment of this application.

In one embodiment, as shown in FIG. 5, the zero crossing detector includes a first comparator COMP, a first delay module DELAY, a first AND gate AND1 and a sample-and-hold module S/H (Sample/Hold). The first comparator may have a first terminal, a second terminal and an output. The first terminal may receive a sense signal Isense indicative of the power converter's inductor current $I_L$, and the second terminal receives a ZCD threshold THR. The output presents a zero crossing indicator signal Sr, which is then received by the first delay module to generate a delayed zero crossing indicator signal Srd.

The first AND gate, shown as a NAND gate NAND1 in the illustrated example, has two inputs and one output. The inputs respectively receive the zero crossing indicator signal Sr and the delayed zero crossing indicator signal Srd, and the output provides a zero crossing detection result ZCD. Continuing the illustrated example, the zero crossing detection result ZCD indicates the occurrence of a current zero crossing when at a high level. The sample-and-hold module S/H samples the zero crossing detection result at the end of each operating period, holds the sampled value at other times, and outputs the mode detection result signal Mdr. In an alternative embodiment, the first AND gate may be replaced with an NAND gate, which outputs a zero crossing detection result ZCD # indicating a current zero crossing when at a low level. After receiving the mode detection result signal Mdr and determining a change in the power converter's current mode there from, the ramp compensation circuit switches the ramp compensation signal from the first slope to the second slope or vice versa in the next operating period.

In order to enable the ramp compensation circuit to switch the ramp compensation signal from the first slope to the second slope or vice versa in the next operating period when detecting a change in the power converter's current mode, the sample-and-hold module in the mode detection circuit sample the signal at the end of each period before the next period begins. At other times, it may perform a sampling operation whenever required for updating the mode detection result signal Mdr.

Figure 6:
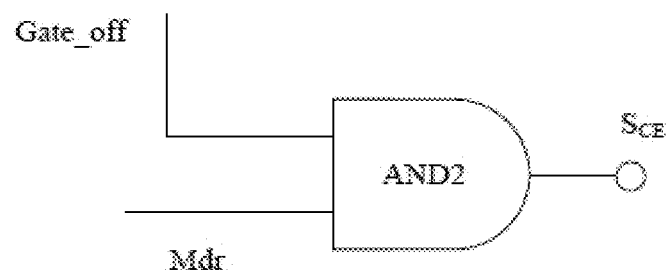
FIG. 6 is a structural schematic of an enable circuit in the power converter according to an embodiment of this application.

In some embodiments, the control circuit in the switched-mode power converter of this application further includes an enable circuit. Specifically, as shown in FIG. 6, the enable circuit includes a second AND gate, which is shown as an AND gate AND2 provided with two inputs in the illustrated example. These inputs respectively receive the mode detection result signal ZCD and the signal Gate_off indicating that the first switching transistor M1 is being OFF as described above in conjunction with the embodiment of FIG. 5. Specifically, Gate_off may be an inverted complementary form of the first control signal HSPWM. The AND gate outputs an enable signal $S_CE$. The enable circuit is configured to not enable the second discharging branch when the mode detection result signal indicates that the power converter is during an inductor demagnetization interval or a zero-current interval (i.e., M1 is OFF as indicated by Gate_off) under DCM operation (i.e., the ZCD result indicates the presence of a zero crossing).

As will be understood by a person of ordinary skill in the art, in order to not enable the second discharging branch when the mode detection result signal indicates that the power converter is during an inductor demagnetization interval or a zero-current interval under DCM operation, the first AND gate should be designed to work at electrical logical levels compatible with those of the signals Sr and Srd, and the second AND gate should be designed to work at electrical logical levels compatible with those of the mode detection result signal and the signal Gate_off. In other embodiments, the first and second AND gates may also be implemented as various combinations of logical gates in accordance with the conventional digital logic conversion rules in the art as long as the same logical determination functions can be performed.

In one embodiment, in order to enable controlled discharging, the control terminal of the third switch S3 in the ramp compensation circuit shown in FIG. 4 may be configured to receive the enable signal $S_{CE}$.

Specifically, in CCM operation of the power converter, the second switch S2 and the third switch S3 of the ramp compensation circuit may be both closed under the control of the second control signal LSPWM and the enable signal $S_CE$, allowing discharging of the ramp compensation signal via two current paths respectively through the second switch and the second current source, and through the third switch and the third current source.

As noted above, in DCM operation, when the second switching transistor M2 in the switching circuit is turned off in response to a zero crossing of the inductor current $I_L$, due to ESR and ESL of the output capacitor C1, the output voltage VOUT may experience an undesirable drop or some glitches or oscillations following the zero crossing. Moreover, the drain voltage $V_{DS}$ of the switching transistor M2 may also experience oscillations following the ZCD, which may be coupled to VFB by parasitic capacitance of the switching transistor, decreasing VFB+VRAMP below VREF and thus falsely triggering a new PWM pulse. In order to solve this problem, as exemplified in FIG. 8, the mode detection circuit performs a current detection operation at the end of each period before the next period begins, and if it is found that the power converter is currently in DCM operation, then from the next operating period onward, when a discharging process takes place at the ramp compensation signal terminal, the enable circuit will adjust the enable signal $S_{CE}$ to not enable the second discharging branch during an inductor demagnetization or zero-current interval. As a result, there is only one discharging current path through the second switch and the second current source available at the ramp compensation signal terminal. This switches the discharging slope to the smaller discharging slope (the second discharging slope). Accordingly, logical control of the second discharging branch from the next operating period onward involves generating the enable signal $S_{CE}$ by performing an AND operation between the aforementioned mode detection result signal Mdr and signal Gate_off.

Figure 8:
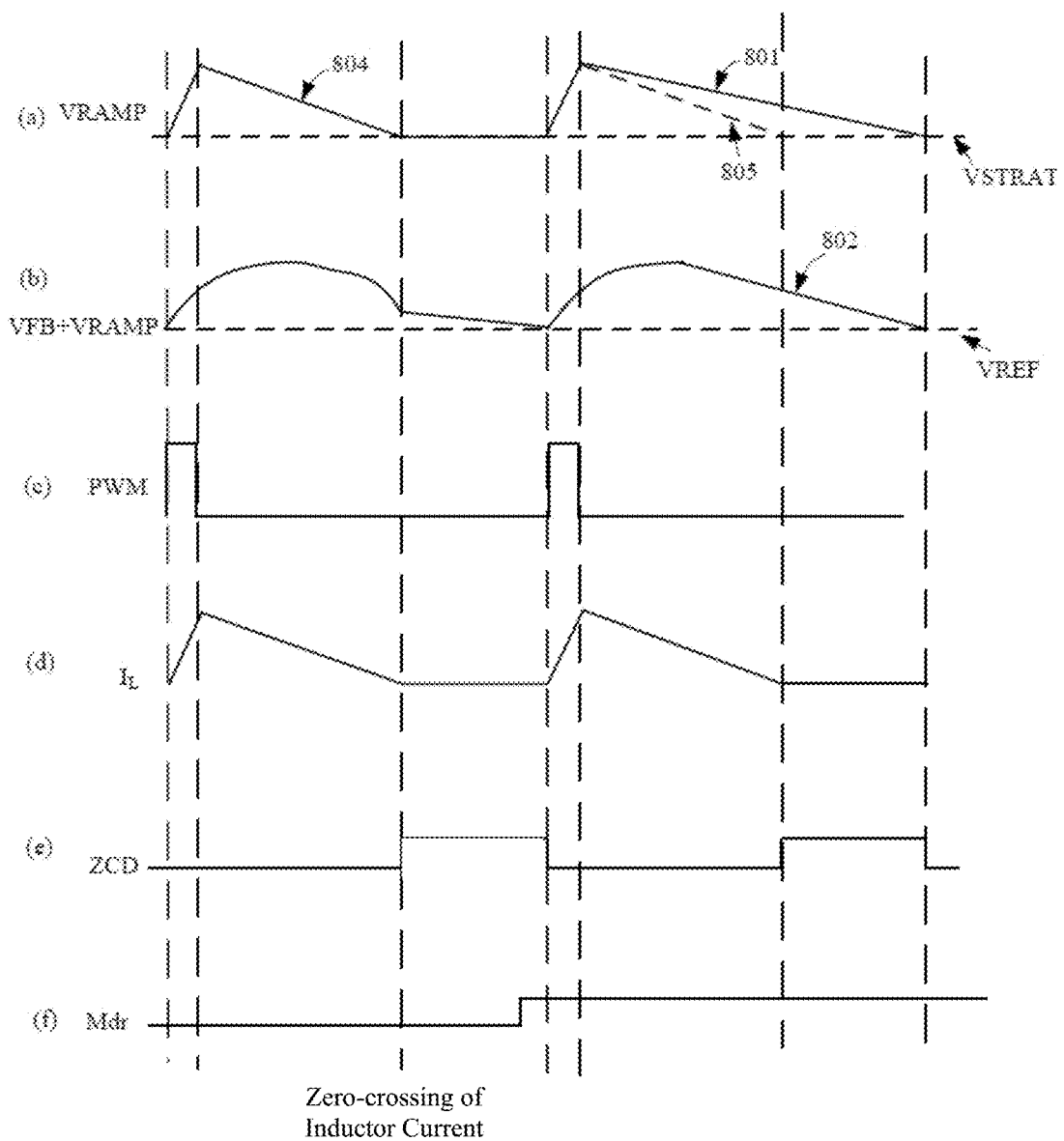
FIG. 8 shows waveforms in the power converter in DCM operation with a ramp compensation signal having a configurable discharging slope according to an embodiment of this application.

In FIG. 8, the waveform 801 is a schematic representation of the ramp signal VRAMP that has experienced a decrease in discharging slope, and the waveform 802 is a schematic representation of the consequent VFB+VRAMP signal. Chart (e) of FIG. 8 shows a waveform of the signal ZCD, and Chart (f) of FIG. 8 is a schematic waveform diagram of the mode detection result signal Mdr. As described above, the sample-and-hold module performs a sampling operation at the end of each period before the next period begins, and the mode detection result signal Mdr is responsively updated. The dashed line 805 in FIG. 8 has the same slope as the waveform 804, and only used to make a comparison with the slope of the waveform 801 to demonstrate the change in discharging rate and thus in waveform slope, and does not represent any actual signal waveform.

After the discharging slope of the ramp signal VRAMP is reduced, i.e., its discharging rate is slowed, VRAMP will not drop to zero volts at the zero crossing time of the inductor current $I_L$, maintaining VRAMP+VFB somewhat above the reference signal VREF. In this way, false triggering of a new PWM pulse is not likely to occur. In FIG. 8, VSTART represents a defined initial value of the ramp compensation signal VRAMP at the beginning of each period.

Figure 9:
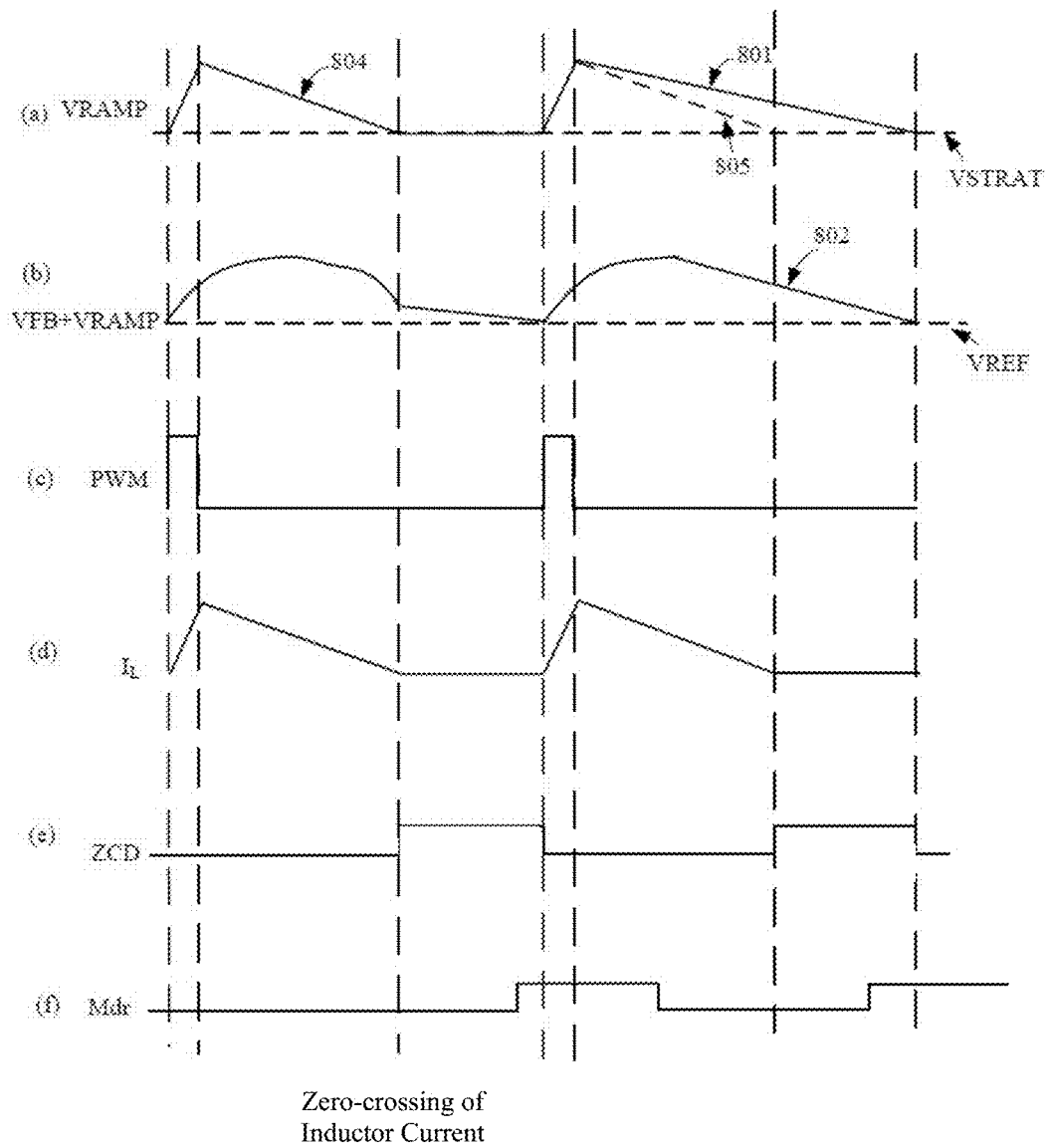
FIG. 9 shows waveforms in the power converter in DCM operation with a ramp compensation signal having a configurable discharging slope according to an embodiment of this application.
Figure 10:
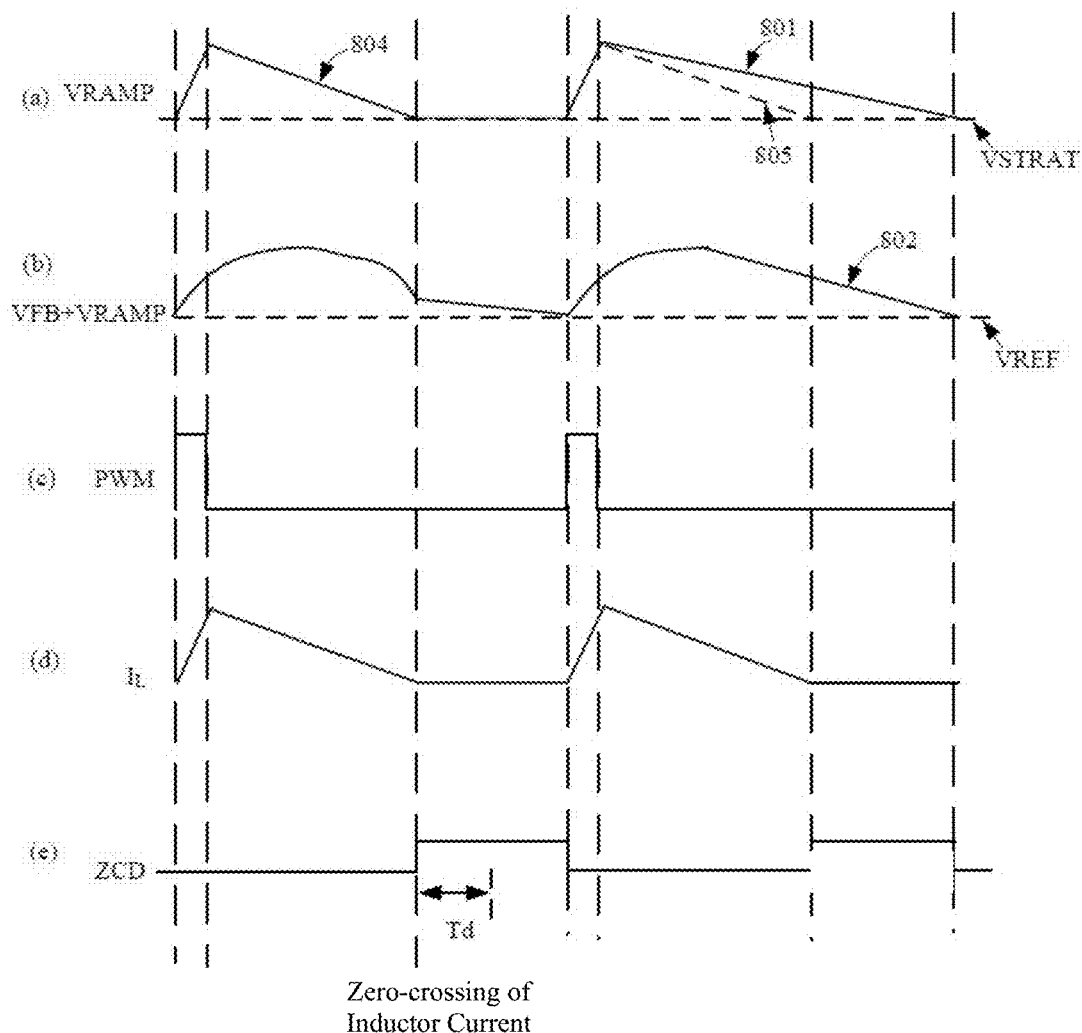
FIG. 10 shows waveforms in the power converter in DCM operation with a ramp compensation signal having a configurable discharging slope according to an embodiment of this application.

The signal ZCD drops back to a low level at the beginning of each operating period in response to the first switching transistor M1 in the power converter being turned on to detect the inductor's output current $I_L$. Apart from a sampling operation performed at the end of each period before the next period begins, the sample-and-hold module in the mode detection circuit may also perform another sampling operation at any other time as required to update the mode detection result signal Mdr, and chart (e) of FIG. 9 schematically illustrates such a sampling operation. In embodiments of this application, as exemplified in FIG. 10, it may also be configured that, when the zero crossing detector in the mode detection circuit shown in FIG. 5 detects that the inductor current $I_L$ crosses zero and remains zero for a duration of time that is greater than or equal to a configurable threshold Td, from the next operating period onward, the discharging slope of the ramp signal VRAMP is reduced. If the inductor current $I_L$ remains zero for a duration of time that is greater than or equal to the threshold duration Td after it crosses zero, the ramp signal VRAMP retains the smaller discharging slope. Otherwise, if the inductor current $I_L$ remains zero for a duration of time that is less than the threshold duration Td after it crosses zero, then from the next operating period onward, the ramp signal VRAMP is switched to the first discharging slope. The threshold duration Td may be defined by the first delay module DELAY.

As described above, at the smaller discharging slope (i.e., the slower discharging rate) of the ramp signal VRAMP, it will not drop to zero volts when the signal ZCD is pulled high. As a result, VRAMP+VFB remains somewhat above the reference signal VREF, and false triggering of a new PWM pulse is therefore unlikely to occur.

In some other embodiments, the ramp compensation circuit in the control circuit of the switched-mode power converter includes a compensation capacitor C3, a first charging branch and a first configurable discharging branch. As exemplified in FIG. 7, the compensation capacitor C3 has a compensation signal terminal and a ground terminal connected to a reference ground GND. The first charging branch is configured to charge the compensation capacitor C3 at a first current I1 in a controlled manner. The first configurable discharging branch is configured to discharge the compensation capacitor C3 at a second discharging current I2 in CCM operation of the switched-mode power converter and at a third discharging current I3 in DCM operation of the switched-mode power converter. The second discharging current I2 is greater than the third discharging current I3.

In some implementations, the control circuit further includes a discharging current adjustment circuit including an AND gate AND4 and a single pole double throw (SPDT) switch S4. The AND gate AND4 has two inputs for respectively receiving the mode detection result signal Mdr and the signal Gate_off indicating that the first switching transistor M1 is being turned off. An output from the AND gate AND4 control the SPDT switch S4 to switch between a first current reference REF1 for setting the second discharging current I2 and a second current reference REF2 for setting the third discharging current I3. The discharging current adjustment circuit is configured to select the second current reference REF2 when the mode detection result signal indicates that the power converter is during a demagnetization interval or a zero-current interval under DCM operation.

Figure 7:
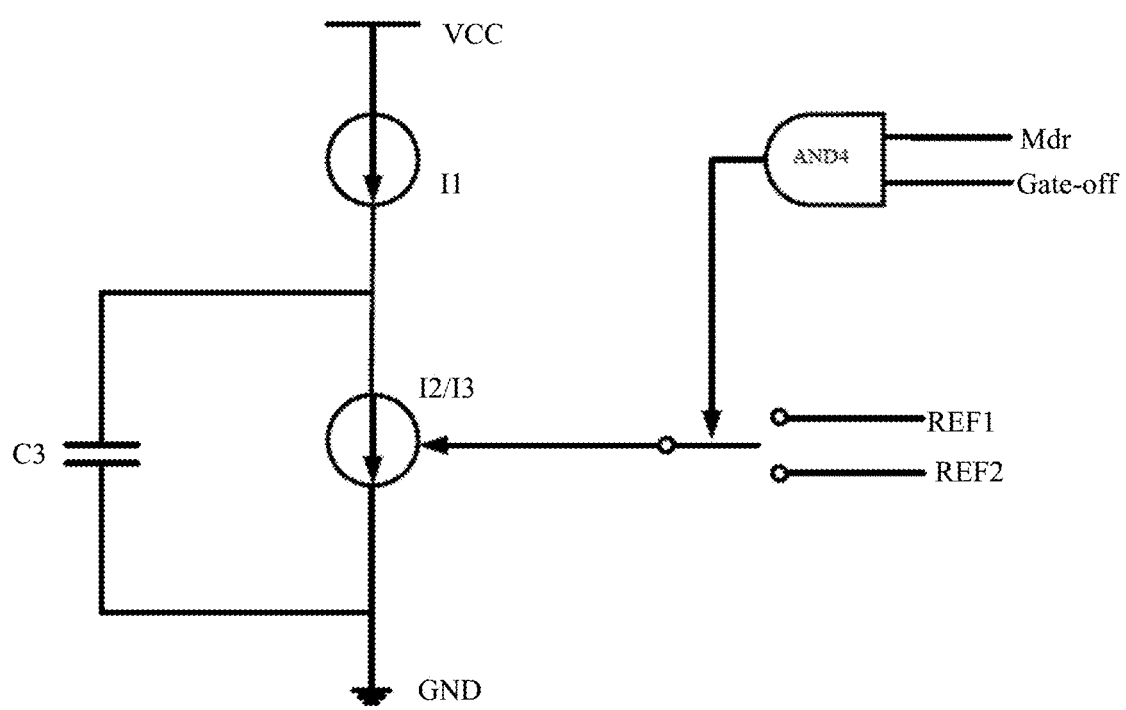
FIG. 7 is a structural schematic of a ramp compensation circuit according to an embodiment of this application.

The ramp compensation circuit and the discharging current adjustment circuit shown in FIG. 7 can work together to also allow the ramp compensation signal to have a first slope during an inductor demagnetization interval in CCM operation of the power converter, and have a second slope that is smaller than the first slope during an inductor demagnetization or zero-current interval in DCM operation of the power converter.

Herein, particular phrases are used to describe embodiment(s) hereof. For example, "one embodiment", "an embodiment" and/or "some embodiments" are intended to refer to a particular feature, structure, or characteristic related to at least one embodiment hereof. Thus, it is to be noted and stressed that appearances of the phrases "one embodiment", "an embodiment" or "an alternative embodiment" mentioned separately in two or more places throughout this specification are not necessarily all referring to the same embodiment. Furthermore, the particular features, structures or characteristics described in connection with one or more embodiments may be combined in any suitable manner.

Similarly, it should be appreciated that, in the foregoing description of embodiments hereof, various features are sometimes grouped together in a single embodiment, figure, or description thereof for the purpose of streamlining the disclosure and aiding in the understanding of one or more of the embodiments hereof. This method of disclosure, however, is not to be interpreted as reflecting an intention that the claimed subject matter hereof requires more features than are expressly recited in each claim. Rather, as the following claims reflect, embodiments lie in less than all features of a single foregoing disclosed embodiment.

While the present application has been described with reference to embodiments illustrated and described herein, those of ordinary skill in the art will recognize that the above embodiments are merely illustrative of this application and various equivalent modifications or substitutions can be made thereto substantially within the spirit hereof. Therefore, any and all changes and variations made to the foregoing embodiments within the essential scope of spirit of the present application fall within the scope of the appended claims.

What is claimed is:

1. A control circuit for a switched-mode power converter, configured to generate a control signal for controlling switching transistors in the power converter, wherein the control circuit comprises:

a comparator provided with a first input, a second input and an output, wherein: the first input of the comparator is configured to receive at least a reference signal; the second input of the comparator is configured to receive at least a feedback signal; and the output of the comparator is configured to output a comparison signal, and wherein the feedback signal is derived from an output voltage;

a ramp compensation circuit configured to generate and apply a ramp compensation signal to the first or second input of the comparator;

an on-time generation circuit configured to start a timer based on the comparison signal or the control signal to generate an on-time timer signal; and a control signal generation circuit configured to generate, based on the comparison signal and the on-time timer signal, the control signal for controlling the switching transistors in the power converter, wherein the ramp compensation signal output from the ramp compensation circuit varies periodically with respect to time and is configured with: a first slope during an inductor demagnetization interval in an operation of the power converter in a continuous inductor current mode (CCM); and a second slope during an inductor demagnetization interval and a zero-current interval in an operation of the power converter in a discontinuous inductor current mode (DCM), and wherein the first slope is greater than the second slope, wherein the control circuit further comprise an operating mode detection circuit, and wherein the operating mode detection circuit is configured to detect an operating mode of the power converter in a current period and to output a mode detection result signal to the ramp compensation circuit, and wherein in an event of detecting a change in a current mode, the ramp compensation circuit switches the ramp compensation signal from the first slope to the second slope or vice versa in a next operating period.

2. The control circuit of claim 1, wherein the mode detection circuit comprises a zero crossing detector to detect whether a zero crossing of the power converter's inductor current occurs in the current period, and wherein: the mode detection result signal indicating that the power converter is operating in the DCM is output if a zero crossing of the power converter's inductor current in the current period is detected by the zero crossing detector; or the mode detection result signal indicating that the power converter is operating in the CCM is output if no zero crossing of the power converter's inductor current is detected by the zero crossing detector in the current period.

3. The control circuit of claim 2, wherein the zero crossing detector comprises:

a first comparator comprising a first terminal, a second terminal and an output, wherein: the first terminal of the first comparator receives a sense signal indicating the inductor current of the power converter; the second terminal of the first comparator receives a zero crossing detection (ZCD) threshold; and the output of the first comparator outputs a zero crossing indicator signal;

a first delay module, wherein the first delay module receives and delays the zero crossing indicator signal to generate a delayed zero crossing indicator signal;

a first AND gate comprising two inputs and an output, wherein: the two inputs of the first AND gate respectively receives the zero crossing indicator signal and the delayed zero crossing indicator signal; and the output of the first AND gate outputs a zero crossing detection result; and a sample-and-hold module, wherein the sample-and-hold module is configured to: sample the zero crossing detection result at an end of each operating period and hold sampled values at other times; and output the mode detection result signal.

4. The control circuit of claim 1, wherein the ramp compensation circuit comprises:

a compensation capacitor comprising a compensation signal terminal and a ground terminal, wherein the ground terminal of the compensation capacitor is connected to a reference ground;

a first charging branch, configured to charge the compensation capacitor at a first current in a controlled manner;

a first discharging branch, configured to discharge the compensation capacitor at a second current in a controlled manner; and a second discharging branch configured to discharge the compensation capacitor at a third current in a controlled manner, wherein the second discharging branch works in CCM operation but not in DCM operation of the power converter.

5. The control circuit of claim 4, further comprising an enable circuit, wherein the enable circuit comprises an AND gate provided with two inputs and an output, wherein: the two inputs of the AND gate is configured to respectively receive a mode detection result signal and an OFF indicator signal indicating an inductor demagnetization interval or a zero-current interval; the output of the AND gate is configured to output an enable signal, and wherein the enable circuit is configured to disable the second discharging branch when the mode detection result signal indicates that the power converter is during an inductor demagnetization interval or a zero-current interval under DCM operation.

6. The control circuit of claim 1, wherein the ramp compensation circuit comprises:

a compensation capacitor comprising a compensation signal terminal and a ground terminal, wherein the ground terminal of the compensation capacitor is connected to a reference ground;

a first charging branch configured to charge the compensation capacitor at a first current in a controlled manner; and a first configurable discharging branch, configured to: discharge the compensation capacitor at a second discharging current in CCM operation of the power converter and discharge the compensation capacitor at a third discharging current in DCM operation of the power converter, wherein the second discharging current is greater than the third discharging current.

7. The control circuit of claim 6, further comprising a discharging current adjustment circuit provided with an AND gate and a single pole double throw (SPDT) switch, wherein the AND gate comprises two inputs and an output, wherein: the two inputs of the AND gate are configured to respectively receive a mode detection result signal and the control signal; and the output of the AND gate is configured to control the SPDT switch to switch between a first current reference and a second current reference, wherein the first and second current references are configured to set the second and third discharging currents respectively, and wherein the discharging current adjustment circuit is configured to select the second current reference when the mode detection result signal indicates that the power converter is during an inductor demagnetization interval or a zero-current interval under DCM operation.

8. A switched-mode power converter, comprising:
a switching transistor; and
a control circuit configured to generate a control signal for controlling the switching transistors, wherein the control circuit comprises:

a comparator provided with a first input, a second input and an output, wherein: the first input of the comparator is configured to receive at least a reference signal; the second input of the comparator is configured to receive at least a feedback signal; and the output of the comparator is configured to output a comparison signal, and wherein the feedback signal is derived from an output voltage;

a ramp compensation circuit configured to generate and apply a ramp compensation signal to the first or second input of the comparator;

a non-time generation circuit configured to start a timer based on the comparison signal or the control signal to generate an on-time timer signal;

a control signal generation circuit configured to generate, based on the comparison signal and the on-time timer signal, the control signal to control the switching transistors in the power converter, wherein: the ramp compensation signal output from the ramp compensation circuit varies periodically with respect to time and is configured with: a first slope during an inductor demagnetization interval in an operation of the power converter in a continuous inductor current mode (CCM); and a second slope during an inductor demagnetization interval and a zero-current interval in an operation of the power converter in a discontinuous inductor current mode (DCM), and wherein the first slope is greater than the second slope, wherein the switched-mode power converter further comprises an operating mode detection circuit, and wherein the operating mode detection circuit is configured to detect an operating mode of the power converter in a current period and to output a mode detection result signal to the ramp compensation circuit, and wherein in an event of detecting a change in a current mode, the ramp compensation circuit switches the ramp compensation signal from the first slope to the second slope or vice versa in a next operating period.

9. The switched-mode power converter of claim 8, wherein the mode detection circuit comprises a zero crossing detector configured to detect whether a zero crossing of the power converter's inductor current occurs in the current period, and wherein: the mode detection result signal indicating that the power converter is operating in the DCM is output if a zero crossing of the power converter's inductor current is detected by the zero crossing detector detects in the current period; or the mode detection result signal indicating that the power converter is operating in the CCM is output if no zero crossing of the power converter's inductor current is detected by the zero crossing detector in the current period.

10. The switched-mode power converter of claim 9, wherein the zero crossing detector comprises:

a first comparator comprising a first terminal, a second terminal and an output, wherein: the first terminal of the first comparator receives a sense signal indicating the inductor current of the power converter; the second terminal of the first comparator receives a zero crossing detection (ZCD) threshold; and the output of the first comparator outputs a zero crossing indicator signal;

a first delay module, configured to receive and delay the zero crossing indicator signal to generate a delayed zero crossing indicator signal;

a first AND gate comprising two inputs and an output, wherein: the two inputs of the first AND gate respectively receives the zero crossing indicator signal and the delayed zero crossing indicator signal; and the output of the first AND gate outputs a zero crossing detection result; and a sample-and-hold module, wherein the sample-and-hold module is configured to: sample the zero crossing detection result at an end of each operating period and hold the sampled values at other times; and output the mode detection result signal.

11. The switched-mode power converter of claim 8, wherein the ramp compensation circuit comprises:

a compensation capacitor comprising a compensation signal terminal and a ground terminal, wherein the ground terminal of the compensation capacitor is connected to a reference ground;

a first charging branch, configured to charge the compensation capacitor at a first current in a controlled manner;

a first discharging branch, configured to discharge the compensation capacitor at a second current in a controlled manner; and a second discharging branch configured to discharge the compensation capacitor at a third current in a controlled manner, wherein the second discharging branch works in CCM operation but not in DCM operation of the power converter.

12. The switched-mode power converter of claim 11, further comprising an enable circuit provided with an AND gate, wherein the AND gate comprises two inputs and an output, wherein: the two inputs of the AND gate respectively receives a mode detection result signal and an OFF indicator signal indicating an inductor demagnetization interval or a zero-current interval; and the output of the AND gate outputs an enable signal, and wherein the enable circuit is configured to disable the second discharging branch when the mode detection result signal indicates that the power converter is during an inductor demagnetization interval or a zero-current interval under DCM operation.

13. The switched-mode power converter of claim 8, wherein the ramp compensation circuit comprises:

a compensation capacitor comprising a compensation signal terminal and a ground terminal, wherein the ground terminal of the compensation capacitor is connected to a reference ground;

a first charging branch, configured to charge the compensation capacitor at a first current in a controlled manner; and a first configurable discharging branch configured to: discharge the compensation capacitor at a second discharging current in CCM operation of the power converter and discharge the compensation capacitor at a third discharging current in DCM operation of the power converter, wherein the second discharging current is greater than the third discharging current.

14. The switched-mode power converter of claim 13, further comprising a discharging current adjustment circuit provided with an AND gate and a single pole double throw (SPDT) switch, wherein the AND gate comprises two inputs and an output, wherein: the two inputs of the AND gate respectively receives a mode detection result signal and the control signal; and the output of the AND gate controls the SPDT switch to switch between a first current reference and a second current reference, wherein the first and second current references are configured to set the second and third discharging currents respectively, and wherein the discharging current adjustment circuit is configured to select the second current reference when the mode detection result signal indicates that the power converter is during an inductor demagnetization interval or a zero-current interval under DCM operation.

* * * * *